Patented Mar. 31, 1931

1,799,110

UNITED STATES PATENT OFFICE

RICHARD H. F. MANSKE, OF NEW HAVEN, CONNECTICUT, ASSIGNOR TO ELI LILLY AND COMPANY, OF INDIANAPOLIS, INDIANA, A CORPORATION OF INDIANA

PROCESS OF PRODUCING EPHEDRINE AND STRUCTURALLY-SIMILAR COMPOUNDS AND PRODUCTS OF SUCH PROCESS

No Drawing.    Application filed July 21, 1928.   Serial No. 294,585.

It is the object of my invention to provide a new and relatively simple process of producing ephedrine and structurally similar compounds, and to produce certain new products by such process.

Ephedrine and its optical isomers, making a total of four in all, have the following formula:

(1) 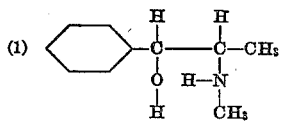

Ephedrine is thus one of a family of secondary amines any one of which may be expressed by the following formula:

(2) 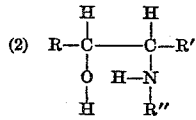

In this formula, broadly speaking:

R is a benzenoid radical, by which term I mean to cover both an unsubstituted phenyl group and an alkyl-substituted phenyl group, with the substitutions (if any) in one or more places and in any position.

R' is H—(CH$_2$)$_x$, in which $x$ may be any desired integer, including zero.

R'' is any organic radical which contains a carbon atom by which it is linked to the nitrogen atom of formula 2.

I have produced a number of these compounds, by my process; in these compounds R has been: the phenyl group, the p-methyl-phenyl group, the p-ethyl-phenyl group, and the 2,5-dimethyl-phenyl group; R' has been hydrogen, the methyl group, and the ethyl group; and R'' has been: the methyl group, the ethyl group, the phenyl-methyl group, the β-hydroxy-ethyl group (—CH$_2$—CH$_2$—OH), the β-phenyl-ethyl group, which are all alkyl or substituted alkyl groups, and the phenyl group.

My process consists broadly of two steps:

1. The condensation of a di-ketone (sometimes called a "dione") of the general formula:

(3) 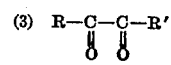

with a primary amine of the general formula:

(4)   H$_2$N—R''

This probably produces an imido-carbonyl compound of the formula:

(5) 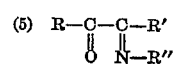

with the elimination of water. I have not as yet isolated and identified any of these imido-carbonyl compounds; but in view of what follows, there seems to be no question of their production by the condensation referred to.

2. The hydrogenation of the product of the first step (the imido-carbonyl compound), as by shaking with hydrogen gas in the presence o fa suitable catalyst such as platinum. This produces the desired ephedrine or structurally similar compound of the general structure shown in formula 2 above, and with a specific formula depending upon what R, R', and R'' were in the initial di-ketone and initial primary amine used.

So far as I know, the imido-carbonyl compound which the evidence indicates is certainly produced as the result of the first step above outlined is a new compound. I have precipitated what I am convinced is one example of such an imido-carbonyl compound, by passing a stream of dry gaseous methylamine into a cooled solution of methyl phenyl di-ketone dissolved in petroleum ether, thereby causing a colorless crystalline solid to appear almost immediately, and at the same time causing the yellow color of the di-ketone rapidly to disappear. This particular example of the intermediate product—the imido-carbonyl compound—probably has the formula:

(6) 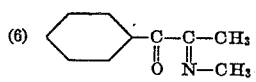

although I have not definitely determined the structure. However, the fact that the catalytic reduction of this substance yields ephedrine is sufficient evidence of the position of the double-bonded nitrogen-carbon union.

The methyl phenyl di-ketone, sometimes called 1-phenyl, 1,2-propanedione, which would be the di-ketone used for condensation with methylamine and the subsequent hydrogenation in the presence of a catalyst to produce ephedrine, is known, as are certain other di-ketones. The structure of methyl phenyl di-ketone is:

(7) 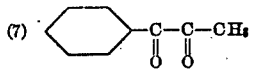

However, there are a number of di-ketones which are somewhat analogous which are not known, and which could be used as the starting point of my process. Among these new di-ketones may be mentioned the following:

Name      Structure
(8) 1-(2,5-dimethyl-phenyl) 1,2-propanedione (9) 1-p-ethyl-phenyl, 1,2-propanedione

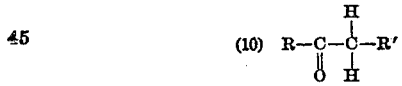

If it is desired to use these di-ketones which have not heretofore been known, they may be prepared by the following general procedure; which is also adaptable for preparing the methyl phenyl di-ketone and other di-ketones that are known, when R is a phenyl or substituted phenyl group and R' contains one or more carbon atoms in Formula 3, and which is believed to be a new process:

A mono-ketone is used as the initial compound, having a two-carbon chain with the desired radicals R and R' at its opposite ends. Such a mono-ketone would have the following general formula:

$$(10) \quad R-\underset{\underset{H}{|}}{\overset{\overset{H}{|}}{C}}-\overset{}{\underset{}{C}}-R'$$

By treating such a mono-ketone with nitrogen dioxide, the desired di-ketone is produced, having the structure shown by Formula 3 above.

I give below several specific examples of the application of my process, to produce several different specific compounds. The compound produced by the first example is ephedrine. That produced by the second is a substituted ephedrine with the ethyl radical substituted for the nitrogen-linked methyl radical of ephedrine, or as R''. That produced by the third is a substituted ephedrine with ethyl radical substituted for both methyl radicals of ephedrine, or as R' and R''. That produced by the fourth is a substituted ephedrine with (a) a methyl-phenyl radical substituted for the phenyl radical of ephedrine, or as R, (b) hydrogen substituted for the carbon-linked methyl radical of ephedrine, or as R', and (c) and ethyl radical substituted for the nitrogen-linked methyl radical of ephedrine, or as R''. That produced by the fifth is a substituted ephedrine with (a) an ethyl-phenyl radical substituted for the phenyl radical of ephedrine, or as R, and (b) an ethyl radical substituted for the nitrogen-linked methyl radical of ephedrine, or as R''. That produced by the sixth is a substituted ephedrine with a phenyl group substituted for the nitrogen-linked methyl radical of ephedrine, or as R''. That produced by the seventh is a substituted ephedrine with a phenyl-methyl radical substituted for the nitrogen-linked methyl radical of ephedrine, or as R''. That produced by the eighth is a substituted ephedrine with a β-hydroxy-ethyl radical substituted for the nitrogen-linked methyl radical of ephedrine, or as R''. That produced by the ninth is a substituted ephedrine with a β-phenyl-ethyl radical substituted for the nitrogen-linked methyl radical of ephedrine, or as R''. That produced by the tenth is a substituted ephedrine with (a) a 2,5-dimethyl-phenyl radical substituted for the phenyl radical of ephedrine, or as R, and (b) an ethyl radical substituted for the nitrogen-linked methyl radical of ephedrine, or as R''.

In giving some of these examples, I give also the preparatory step of preparing the di-ketone as outlined above, by oxidation with nitrogen dioxide; and although that is not an essential part of my general process in its broader aspects, it is new so far as I know.

*Example 1*

A few drops of an alcoholic solution of hydrogen chloride are added to 67 parts by weight of ethyl phenyl mono-ketone, desirably contained in a flask fitted with an inlet tube leading to the bottom. I desirably also add a suitable de-hydrating agent, such as 10 parts or more of anhydrous calcium chloride, to remove any water that may be contained in the alcohol and that is formed in the reaction. The mixture is heated to about 60° C., and 35 parts of dry NO₂ from a weighed tube is passed in, sufficiently slowly so that any escape of the NO₂ from the liquid is substantially prevented. The temperature should be kept between about 60° C. and 75° C.; and may conveniently be prevented from rising above 75° C. by retarding the rate of inflow of the NO₂, or by cooling either the NO₂ or the mixture. Water is formed; and when not taken care of it floats about in large drops; but with calcium chloride present, the water is at once taken up thereby. The reaction is allowed to go on until the temperature of the mixture begins to drop spontaneously, or until NO₂ begins to escape from the exit in case the amount thereof supplied was not weighed. Any excess NO₂ is removed by drawing air through the apparatus. The reaction mixture is washed with water; and then with a solution of sodium carbonate until no more carbon dioxide is evolved. Then the oily layer is separated from the aqueous solution, and dried. The liquid is now distilled under reduced pressure, and the fraction which distills off at a pressure of about 20 millimeters of mercury and between 120° and 130° C. is saved. This product contains the desired di-ketone, and also some of the initial mono-ketone.

60 parts of sodium acid sulphite is now added to the product, and shaken until most of the yellow color disappears. Water is added, if necessary, to give good suspension. The sodium acid sulphite readily forms an ether-insoluble salt with the di-ketone, but reacts only slightly and with difficulty with the mono-ketone. The mass is now well cooled; and is then filtered. Some ether may be run through to wash out any mono-ketone that was adsorbed on the sulphite salt, and this ether rests as a separate layer on the water filtrate. This water and ether filtrate may be saved to recover the mono-ketone, and also any di-ketone which may be in the water layer. The bisulphite salt, which contains most of the di-ketone that was formed, is treated with about 200 parts of hot water, and about 30 parts of sodium carbonate. The material is now steam-distilled until no more di-ketone is obtained in the distillate. The di-ketone is separated from the co-present water of the distillate, and dried.

So far in this example, the process has been the preparatory one of producing the di-ketone, and is not essential to my broad process of preparing the final products.

7.4 parts of methyl phenyl di-ketone, whether obtained as above outlined or in some other manner, is now treated with 50 parts of ethyl alcohol, and an alcoholic solution of methylamine containing about 3 parts of methylamine is added. A slight temperature rise is noted, due to the formation of the imido-carbonyl compound having presumably the structure shown in Formula 6. A small amount of platinum catalyst (0.2 parts is a convenient quantity), suitably prepared to make it effective as a catalyst as outlined in the literature, is added; and the flask is filled with hydrogen. The mixture is suitably agitated, until hydrogenation is complete. In this action, the hydrogen reacts with the imido-carbonyl compound that had been produced, with the platinum acting as a catalyst, and produces hydrogenation of such imido-carbonyl compound.

When the hydrogenation is completed, which is indicated by the fact that no more hydrogen is taken up, air is admitted; whereupon the catalyst readily coagulates, and may be removed by filtration. The filtrate is evaporated, preferably under reduced pressure, to a small volume; is made faintly acid with hydrogen chloride; and is evaporated again; whereupon on cooling, ephedrine hydrochloride usually separates out as a white crystalline salt, which is separated from the liquid. This crystalline salt consists mainly of racemic ephedrine hydrochloride, with a relatively smaller amount of racemic pseudo-ephedrine hydrochloride. These may be separated by known methods, as by fractional crystallization from chloroform. A substantially pure racemic ephedrine hydrochloride may thus be obtained, whose melting point is about 186° C. The racemic ephedrine hydrochloride has the formula:

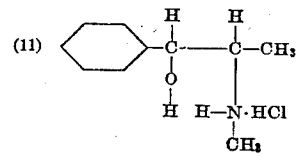

Example 2

This process is substantially like that of Example 1, save that in the condensation step of the amine with the di-ketone, the amine used is ethylamine instead of methylamine, and that the proportions are changed to correspond with the change in molecular weights. This gives as an intermediate product an imido-carbonyl compound of the formula:

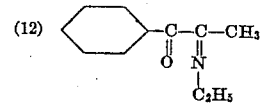

This gives as a final product the hydrochloride of an ephedrine-like substance of the formula:

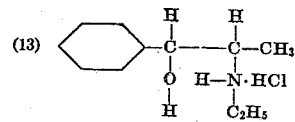

This crystallizes as a white solid, having a melting point of about 198° C.

Example 3

This process is also substantially like that of Example 1, save that in the condensation step of the amine with the di-ketone, the amine used is ethylamine instead of methylamine, just as in Example 2, and that the di-ketone is ethyl phenyl di-ketone instead of methyl phenyl di-ketone, and that the proportions are changed to correspond with the changes in molecular weights. The ethyl phenyl di-ketone, sometimes called 1-phenyl 1,2-butanedione, is known, and has the following formula:

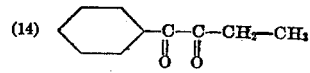

The reaction just referred to gives as an intermediate product an imido-carbonyl compound of the formula:

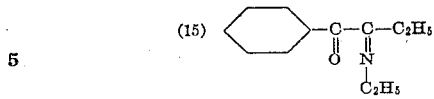

It gives as a final product the hydrochloride of an ephedrine-like substance of the formula:

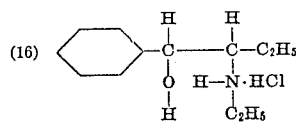

This crystallizes as a white solid, having a melting point of 226–7° C.

The di-ketone which is used in this Example 3 may be prepared by the process of oxidation with nitrogen dioxide in the same general way as described under Example 1; save that instead of starting with ethyl phenyl mono-ketone the initial compound which is treated with the nitrogen dioxide is propyl phenyl mono-ketone.

*Example 4*

This process is substantially like that of Example 2, save that the di-ketone, instead of being methyl phenyl di-ketone, with the phenyl group joined to one of the ketone-carbon atoms and the methyl group joined to the other of the ketone-carbon atoms, is an isomer thereof, with a p-methyl-phenyl group joined to one of the ketone-carbon atoms and hydrogen joined to the other; so that the di-ketone, which is known, has the following formula:

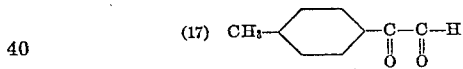

When this is treated with ethylamine, with proportions of course changed to correspond with the changes in molecular weights, this gives as an intermediate product an imido-carbonyl compound of the formula:

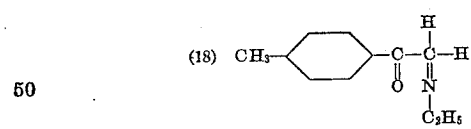

This gives as a final product, after reduction with hydrogen in the presence of a catalyst, the hydrochloride of an ephedrine-like substance of the formula:

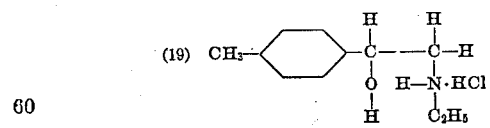

This crystallizes as a white solid, having a melting point of 209–11° C. It forms a picrate having a melting point of about 158° C.

*Example 5*

This process is substantially like that of Example 2, save that the di-ketone, instead of being methyl phenyl di-ketone, with an unsubstituted phenyl group joined to one of the ketone-carbon atoms and the methyl group joined to the other of the ketone-carbon atoms, is a methyl p-ethyl-phenyl di-ketone, with the p-ethyl-phenyl group joined to one of the ketone-carbon atoms and the methyl group joined to the other; so that the di-ketone has the following formula:

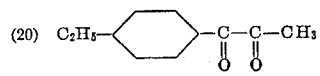

When this is treated with ethylamine, with proportions of course changed to correspond with the changes in molecular weights, it gives as an intermediate product an imido-carbonyl compound of the formula:

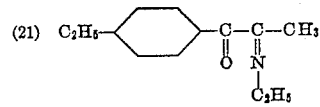

This gives as a final product, after reduction by hydrogen in the presence of a catalyst, the hydrochloride of an ephedrine-like substance of the formula:

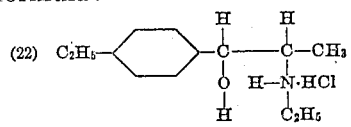

This crystallizes as a white solid having a melting point of about 208° C.

The di-ketone which is used in this Example 5 may be prepared by a process of oxidation with nitrogen dioxide in the same general way as described under Example 1; save that instead of starting with ethyl phenyl mono-ketone, the initial compound which is treated with the nitrogen dioxide is ethyl p-ethyl-phenyl mono-ketone.

*Example 6*

This process is substantially like that of Example 1, save that in the condensation step of the amine with the di-ketone, the amine used is benzylamine instead of methylamine, and that the proportions are changed to correspond with the change in molecular weights. This gives as an intermediate product an imido-carbonyl compound of the formula:

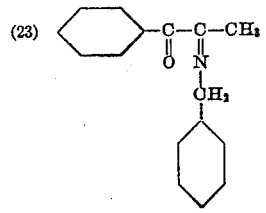

This gives as a final product the hydrochloride of an ephedrine-like substance of the formula:

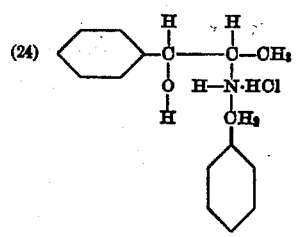

This crystallizes out as a white solid, having a melting point of 184–5° C. This compound is sparingly soluble in cold water and in alcohol, and is insoluble in acetone.

*Example 7*

This process is substantially like that of Example 1, save that in the condensation step of the amine with the di-ketone, the amine used is ethanolamine,

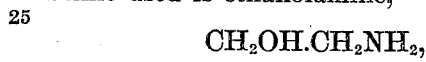

instead of methylamine, and that the proportions are changed to correspond with the change in molecular weights. This gives as an intermediate product an imido-carbonyl compound of the formula:

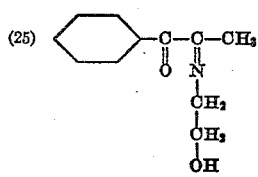

This gives as a final product the hydrochloride of an ephedrine-like substance of the formula:

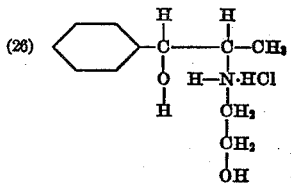

This crystallizes as a white solid, having a melting point of about 166° C. This compound is readily soluble in water, less so in alcohol, and sparingly soluble in acetone.

*Example 8*

This process is substantially like that of Example 1, save that in the condensation step of the amine with the di-ketone, the amine used is aniline instead of methylamine, and that the proportions are changed to correspond with the change in molecular weights. This gives as an intermediate product an imido-carbonyl compound of the formula:

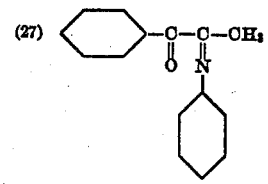

This gives as a final product the hydrochloride of an ephedrine-like substance of the formula:

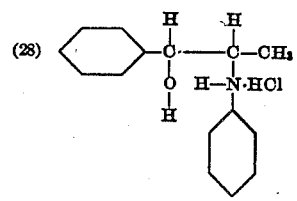

The properties of this compound are somewhat indefinite, but it has a melting point of about 177° C.

*Example 9*

This process is substantially like that of Example 1, save that in the condensation step of the amine with the di-ketone, the amine used is β-phenyl-ethylamine instead of methylamine, and that the proportions are changed to correspond with the change in molecular weights. This gives as in intermediate product an imido-carbonyl compound of the formula:

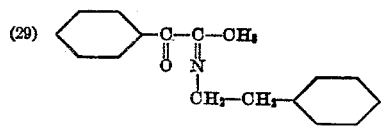

This gives as a final product the hydrochloride of an ephedrine-like substance of the formula:

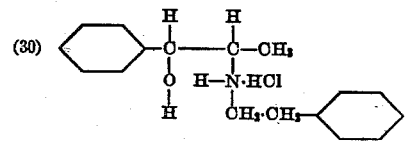

This crystallizes as a white solid, having a melting point of 207–208° C.

*Example 10*

This process is substantially like that of Example 2, save that the di-ketone, instead of being methyl phenyl di-ketone, with an unsubstituted phenyl group joined to one of the ketone-carbon atoms and the methyl group joined to the other of the ketone-carbon atoms, is a methyl 2,5-dimethyl-phenyl di-ketone, with the 2,5-dimethyl-phenyl group joined to one of the ketone-carbon atoms and the methyl group joined to the other; so that the di-ketone has the following formula:

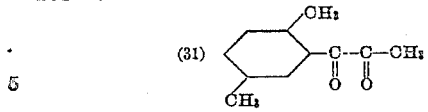

When this is treated with ethylamine, with proportions of course changed to correspond with the changes in molecular weights, it gives as an intermediate product an imido-carbonyl compound of the formula:

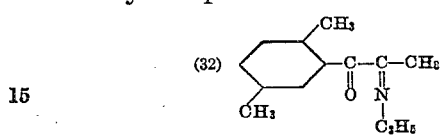

This gives as a final product, after reduction by hydrogen in the presence of a catalyst, the hydrochloride of an ephedrine-like substance of the formula:

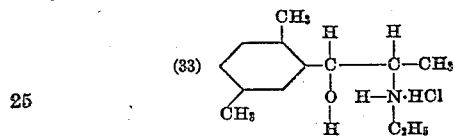

This crystallizes as a white solid having a melting point of about 221° C.

The di-ketone which is used in this Example 10 may be prepared by a process of oxidation with nitrogen dioxide in the same general way as described under Example 1; save that instead of starting with ethyl phenyl mono-ketone, the initial compound which is treated with the nitrogen dioxide is ethyl 2,5-dimethyl-phenyl mono-ketone.

In all these examples, the final product shown is the hydrochloride, of either ephedrine in Example 1 or of a structurally similar substance in the other examples. Such hydrochloride may be converted into the corresponding simple alkaloid, by neutralizing the HCl with a suitable base, such as sodium or potassium hydroxide. The usual salts of these alkaloids may be prepared by treating them with the necessary acids; such as the nitrate, the sulphate, the hydriodide, etc., as well as the hydrochloride.

Many other examples might be given; but the ten which have been given sufficiently illustrate the general nature of the process, and illustrate how various final results may be obtained by varying the nature of the di-ketone and of the amine which are caused to react in the first or condensation step of the general process.

I claim as my invention:

1. The process of preparing ephedrine and structurally similar compounds, which consists in: (1) the condensation of a di-ketone of the general formula:

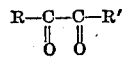

with a primary amine of the general formula: $H_2N$—R'' in which R is a benzenoid radical, R' is H—$(CH_2)_x$ with $x$ any desired integer including zero; and R'' is an organic radical which contains a carbon atom by which it is linked to the nitrogen atom; (2) the subsequent hydrogenation of the product of the first step.

2. The process of preparing compounds structurally similar to ephedrine as set forth in claim 1, and in which R is an alkyl-substituted phenyl group.

3. The process of preparing compounds structurally similar to ephedrine as set forth in claim 1, and in which R is a p-alkyl-substituted phenyl group.

4. The process of preparing ephedrine and structurally similar compounds as set forth in claim 1, and in which R' is an alkyl radical.

5. The process of preparing ephedrine and structurally similar compounds as set forth in claim 1, and in which R'' is an alkyl radical.

6. The process of preparing ephedrine and structurally similar compounds as set forth in claim 1, and in which both R' and R'' are methyl groups.

7. A compound including in its molecule a structure and of the formula:

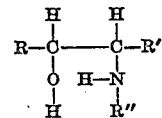

in which R is an alkyl-substituted phenyl group, R' is $H(CH_2)_x$ in which $x$ is any integer including zero, and R'' is an alkyl, substituted alkyl, or phenyl group.

8. A compound including in its molecule a structure of the formula:

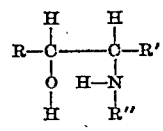

in which R is an alkyl-substituted phenyl group, and R' and R'' are alkyl radicals.

9. A compound including in its molecule a structure of the formula:

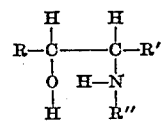

in which R is a p-alkyl-substituted phenyl group, R' is $H(CH_2)_x$ in which $x$ is any integer including zero, and R'' is an alkyl, substituted alkyl, or phenyl group.

10. A compound including in its molecule a structure of the formula:

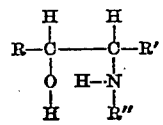

in which R is a di-alkyl-substituted phenyl group, R' is H (CH$_2$)$_x$ in which $x$ is any integer including zero, and R" is an alkyl, substituted alkyl, or phenyl group.

11. The process of preparing ephedrine and structurally similar compounds as set forth in claim 1, and to which both R' and R" are alkyl radicals.

12. The process of preparing ephedrine and structurally similar compounds, which consists in: (1) the condensation of a diketone of the general formula:

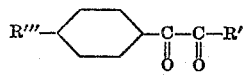

with a primary amine of the general formula: H$_2$N—R" in which R''' is H—(CH$_2$)$_y$ and R' is H—(CH$_2$)$_x$ with $y$ and $x$ each any desired integer including zero; and R" is an organic radical which contains a carbon atom by which it is linked to the nitrogen atom; (2) the subsequent hydrogenation of the product of the first step.

13. The process of preparing ephedrine and structurally similar compounds as set forth in claim 12, and in which R' is an alkyl radical.

14. The process of preparing ephedrine and structurally similar compounds as set forth in claim 12 and in which R" is an alkyl radical.

15. The process of preparing ephedrine and structurally similar compounds as set forth in claim 12, and in which R' and R" are both methyl groups.

16. The process of preparing ephedrine and structurally similar compounds as set forth in claim 12, and in which R' and R" are both alkyl radicals.

17. The process of preparing ephedrine and structurally similar compounds as set forth in claim 12, and in which R''' is an alkyl radical.

18. The process of preparing ephedrine and structurally similar compounds as set forth in claim 12, and in which R', R", and R''' are all alkyl radicals.

19. The process of preparing ephedrine and structurally similar compounds as set forth in claim 12, and in which at least two of the radicals R', R", and R''' are alkyl radicals.

20. The process of preparing ephedrine and structurally similar compounds as set forth in claim 12, and in which at least two of the radicals R', R", and R''' are methyl groups.

In witness whereof, I have hereunto set my hand at Indianapolis, Indiana, this 22d day of June, A. D. one thousand nine hundred and twenty eight.

RICHARD H. F. MANSKE.